Patented July 10, 1951

2,560,227

UNITED STATES PATENT OFFICE 2,560,227

PREPARATION OF MALONALDEHYDE OXIMES

Roger F. Kleinschmidt, Easton, Pa., assignor to General Aniline & Film Corporation, New York, N. Y., a corporation of Delaware No Drawing. Application February 17, 1948, Serial No. 9,022

2 Claims. (Cl. 260—566)

This invention relates to the novel dioximes of malonaldehyde diacetal and the process of producing them.

I have discovered that dioximes of 1,3-dialdehydes may be obtained in good yield by mixing a 1,3-dialdehyde diacetal with an aqueous solution of acid salt of hydroxylamine. The reaction proceeds readily at room or slightly elevated temperatures and the product is obtained in good yield.

This reaction can be illustrated by the following general equation:

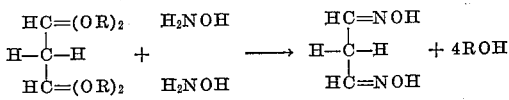

wherein the groups R stand for the same or different hydrocarbon radicals.

Since the reaction involves the hydrolysis of the malonaldehyde diacetal so that the OR groups are removed and converted to alcohols or phenols, it is preferable to employ the lower alkyl diacetals of malonaldehyde, such as malonaldehyde tetramethyl acetal, malonaldehyde tetraethyl acetal, mixed lower alkyl acetals such as methyl triethyl malonaldehyde acetal and the like. However, so far as the operability is concerned, the diacetals of malonaldehyde with any of the usual alcohols or phenols or mixed acetals may be employed.

In general, the reaction is carried out by mixing the malonaldehyde diacetal with an aqueous solution of an acid salt of hydroxylamine, for example, hydroxylamine hydrochloride, hydroxylamine sulfate, hydroxylamine nitrate, etc. An excess of the acid salt of hydroxylamine is generally employed and mixing may be effected at room or a slightly elevated temperature and a 2-phase mixture is obtained. The mixture is then stirred with heating up to the boiling point of the mixture and preferably to about 60° C., if desired, until the acetal has been hydrolyzed completely or in part and only one liquid phase exists. The reaction mixture is then made neutral or even alkaline by the addition of an aqueous solution of an alkali such as the alkali metal bicarbonates, carbonates, acetates and hydroxides. The desired malonaldehyde dioxime readily separates from the neutralized reaction mixture, its precipitation being accelerated by chilling, if desired.

The details of the present invention will be apparent to those skilled in the art from a consideration of the following typical example of a specific embodiment thereof.

Example

To a solution of 35 parts of hydroxylamine hydrochloride in 75 parts of water was added 51 parts of methyl triethyl acetal of malonaldehyde, and the resulting 2-phase mixture was stirred and warmed gently until a one-phase yellow solution was obtained. This mixture was then neutralized by slowly adding 26.5 parts of sodium carbonate in 75 parts of water while chilling and a white precipitate, malonaldehyde dioxime, slowly formed. The white solid, when filtered off and air dried, had a melting point of 146–147° C.

It will be apparent that the particular acetal of malonaldehyde employed and the particular hydroxylamine salt employed are not critical and that any of the compounds of this type previously mentioned may be employed, if desired, without noticeable effect on the reaction. It will also be apparent that O-substituted dioximes may readily be prepared by replacing the hydroxylamine salt employed in the foregoing example with O-substituted hydroxylamines, thus forming the O-ethers or esters of the dioximes corresponding to the particular substituents on the oxygen atom of the hydroxylamine which is employed.

It will also be apparent that if desired, various 2-substituted malonaldehyde diacetals such as the halogenated malonaldehyde diacetals prepared by the process described in my copending application Serial No. 9,021, filed February 17, 1948, may be employed in place of the unsubstituted malonaldehyde acetals previously mentioned, so as to obtain the correspondingly 2-substituted malonaldehyde dioximes. The type of 2-substituted malonaldehyde diacetals and O-substituted hydroxylamines which may be considered as equivalents of the malonaldehyde acetals previously mentioned and hydroxylamine respectively, as well as the generic nature of the reaction and the type of dioximes which may be produced, are illustrated by the following equation:

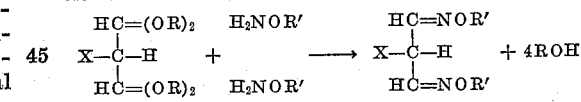

wherein the R's stand for the same or different hydrocarbon radicals, X stands for hydrogen, halogen, hydrocarbon, i. e., alkyl, e. g. methyl, ethyl, butyl, lauryl, stearyl, etc., aralkyl, e, g. benzyl; aryl, e. g. phenyl, tolyl, naphthyl, etc. and the R's stand for hydrogen or hydrocarbon or acyl radicals.

The dioximes of the 1,3-dialdehydes can be dehydrated either catalytically using a dehydration catalyst or chemically by means of suitable dehydrating agents to the corresponding dinitriles. The latter are valuable as intermediates for the preparation of dyestuffs, pharmaceuticals, etc.

I claim:

1. The method of producing 1,3-dialdehyde dioximes which comprises mixing an aqueous solution of an acid salt of hydroxylamine with a 1,3-dialdehyde diacetal of the formula

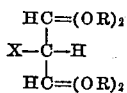

wherein R represents lower alkyl radical and X represents a member of the group consisting of hydrogen, halogen and alkyl, aralkyl and aryl radicals.

2. The method of producing dioxide of malonaldehyde which comprises mixing an aqueous solution of an acid salt of hydroxylamine with a lower alkyl diacetyl of malonaldehyde.

ROGER F. KLEINSCHMIDT.

REFERENCES CITED

The following references are of record in the file of this patent:

UNITED STATES PATENTS

| Number | Name | Date |
|---|---|---|
| 2,009,818 | Salzberg et al. | July 30, 1935 |

OTHER REFERENCES

Richter: Organic Chemistry (1944), vol. I, page 408.